Oct. 12, 1965   R. O. CROSGROVE   3,211,871
CONTROL DEVICE WITH SWITCHES ACTUATED BY CAMS
DEFINING A HELICAL TRACE

Filed Dec. 26, 1962   2 Sheets-Sheet 1

*INVENTOR.*
ROBERT O. CROSGROVE
BY
AGENT

*INVENTOR.*
ROBERT O. CROSGROVE
BY
AGENT

United States Patent Office 3,211,871
Patented Oct. 12, 1965

3,211,871
CONTROL DEVICE WITH SWITCHES ACTUATED BY CAMS DEFINING A HELICAL TRACE
Robert O. Crosgrove, Sunland, Calif., assignor to North American Aviation, Inc.
Filed Dec. 26, 1962, Ser. No. 246,903
6 Claims. (Cl. 200—158)

The present invention relates to a switch control system and more particularly to a limit switch for remote handling equipment.

There are numerous work areas where handling equipment such as elevators, cranes, derricks, conveyors, and the like requires remotely positioned switch control systems. For example, walls or similar shielding arrangements may prevent visual determination of a remote work operation or the length of travel of a remote moving object or load necessary for operator control. Present switch control arrangements do not provide a system which facilitates the accurate regulation of either a machine operation or a remote moving object or load. Generally, the total length of travel of the remote moving object or load is relatively long when compared to the control space that is available for remote switch control system. Known switch control arrangements do not provide the desirable features of a compact control system having both a high degree of precision and reliability with a minimum of complex interactions between a minimum number of components in the system.

Accordingly, it is an object of the invention to provide a new and improved limit switch.

Another object of the invention is to provide a new and improved switch control system that traces a record correlated to the length of travel of a remote moving object in a compact arrangement.

A further object of the invention is to provide a new and improved switch control system that provides the same degree of control accuracy as if the remote moving object being controlled had itself actuated a control switch in the system.

Briefly, in accordance with one form of the invention, a new and improved limit switch is provided comprising a remote drive means rotating a first movable member, a second member associated with the movable member providing a helical trace, an actuating means rotated by the movable member for translation of the actuating means, and an adjustable control means positioned in a sector of the helical trace to intercept the actuating means.

Figure 1:
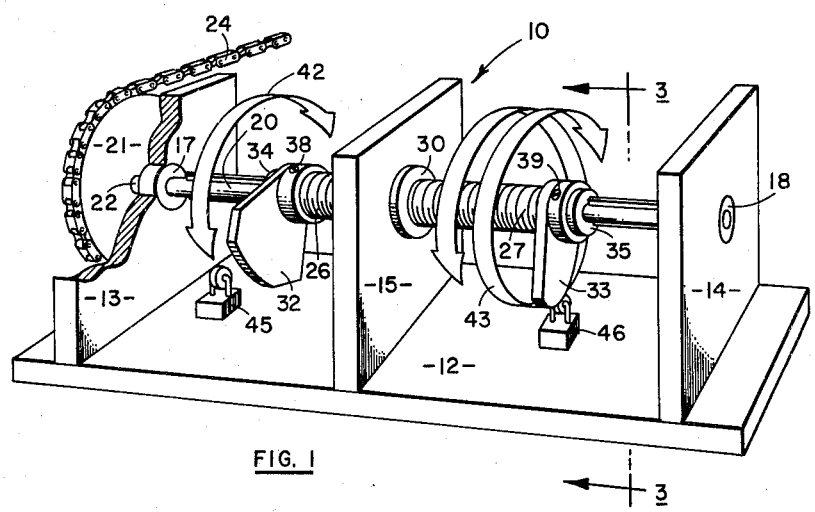
Figure 2:
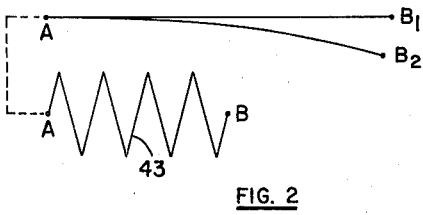
Figure 3:
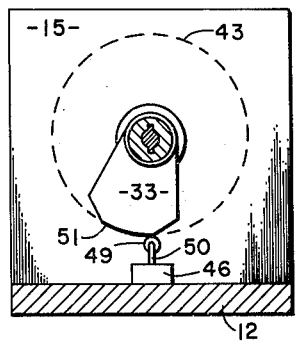
Figure 4:
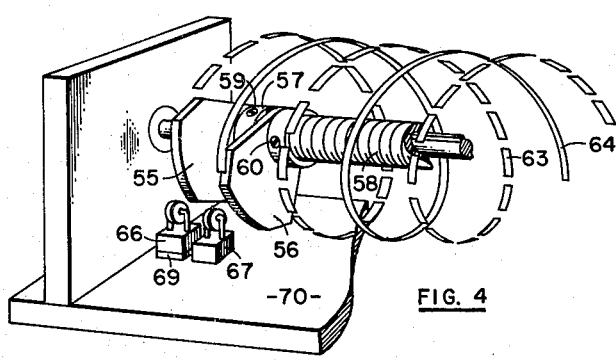
Figure 5:
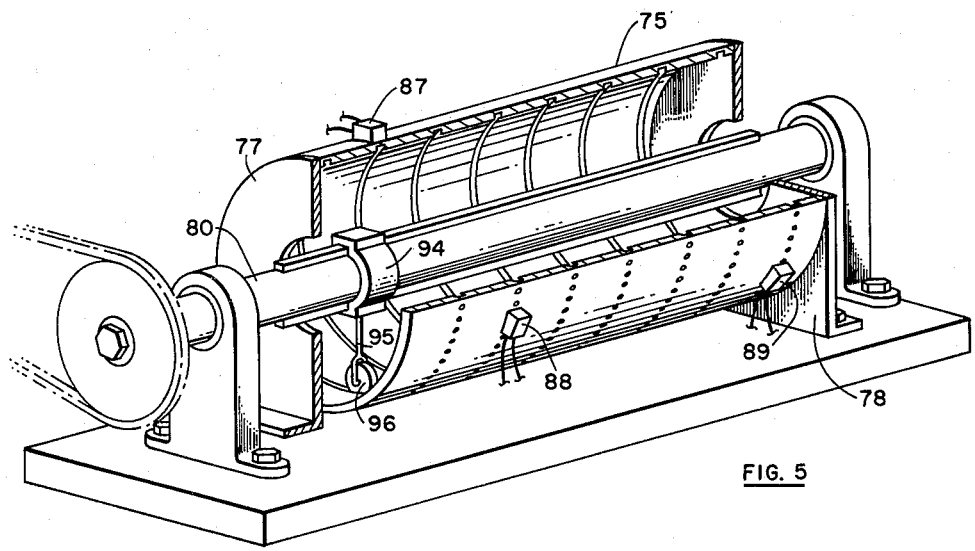
Figure 6:
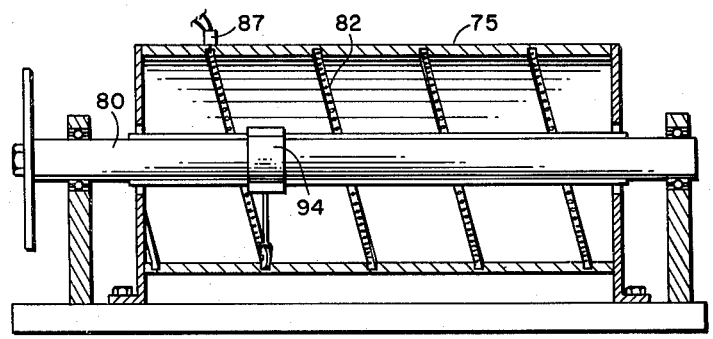
Figure 7:
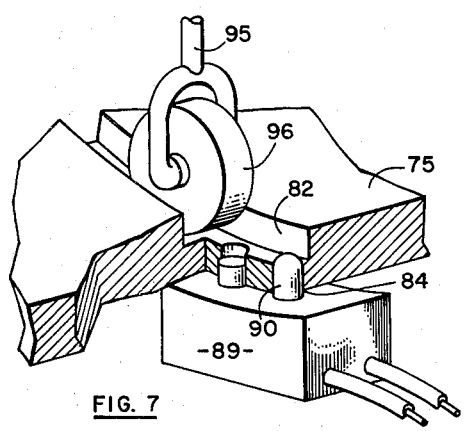

Further objects, features, and the attending advantages of the invention will be apparent with regard to the following description read in conjunction with the accompanying drawings in which:

FIGURE 1 is a perspective view, partly broken-out, of one form of the invention;
FIGURE 2 is a graphic representation of the switch control principle of the invention;
FIGURE 3 is a sectional end view of the invention along the line 3—3 as shown by FIGURE 1;
FIGURE 4 is a partial perspective view of one modification of the invention;
FIGURE 5 is a broken-out sectional view in perspective of another modification of the invention;
FIGURE 6 is a longitudinal sectional view of the modification as shown by FIGURE 5; and
FIGURE 7 is a partial perspective view of the modification as shown by FIGURES 5 and 6.

Referring to FIGURE 1, one form of the new and improved limit switch control system 10 of the invention has a suitable support member such as a base plate or sidewall 12 with end walls 13 and 14. An intermediate wall 15 is positioned between the end walls 13 and 14. The support member can be totally enclosed if desired by the addition of suitable wall members to protect the switch control system 10 from the introduction of foreign material such as dust, oil, and the like.

Suitable bearing members 17 and 18 are positioned in the respective end walls 13 and 14. The bearings 17 and 18 rotatably support a multiple spline shaft therein, such as the two-spline shaft 20. The spline shaft 20 is rotatably driven by a suitable gear 21 that is secured to one end 22 of the shaft by any well-known means such as a suitable key, castellated nut, and the like. The gear 21 is driven by a remote handling equipment drive means, not shown, through a suitable power transmission means, such as the power drive chain 24. The gear 21, in accordance with the invention, is simultaneously driven whenever the remote drive means is actuated. The remote drive means may be any well-known drive arrangement such as commonly used in elevators, derricks, cranes and the like which are adapted to move a remote object such as crane hooks, tongs, buckets, and the like.

Lead screw 26 has a bore adapted for sliding engagement on the spline shaft 20. The lead screw 26 has an external power transmission screw thread such as the Acme thread 27 as shown by FIGURE 1. A stationary nut insert 30 in the intermediate wall 15 threadably engages the external thread 27. The simultaneous rotation of the spline shaft 20 by the remote drive means will produce either forward or reverse axial translation of the driven lead screw 26 along the spline shaft 20 by the threadable engagement of the lead screw by the stationary insert 30.

Radial cam actuators 32 and 33 are positioned on or near the respective ends 34 and 35 of the lead screw 26 and are rotated thereby. Set screws, such as set screws 38 and 39, permit the axial and angular alignment of the cams 32 and 33 on the lead screw 26. The simultaneous rotation of the lead screw 26 by the remote drive means through the spline shaft 20 moves the radial cams 32 and 33 so that each cam generates a respective helical trace 42 and 43. At least one of the respective helical traces 42 and 43 has a trace length that is equal to or substantially equal to the total length of travel of a remote moving object, not shown, which is simultaneously driven by the drive means when the lead screw 26 is rotated.

FIGURE 1 shows electrical control switches 45 and 46 secured to the base plate or side wall 12 of the switch control system 10. The electrical control switches 45 and 46, or other suitable control means such as hydraulic, mechanical, neumatic or comparable switch arrangements, can also be secured to one or more walls of the switch control system 10 as may be desired. The electrical control switches 45 and 46, or comparable switch arrangements, can be secured by bolts, screws and the like. It is considered to be within the inventive concept to provide longitudinal or lateral adjustment, i.e. with reference to the axis of rotation of the lead screw 26, by passing the bolts, or screws through suitably oriented slots, not shown, in the associated wall of the switch control system 10.

The electrical control switches 45 and 46 are suitably positioned to provide an exact sector or point intercept of each of the previously described helical traces 42 and 43, respectively. The control switches 45 and 46 are actuated by the respective cams 32 and 33 to regulate and control the remote handling drive means, not shown, and thus provide, in a minimum of space, suitable remote control over the entire length of travel of the remote moving object.

FIGURE 2 schematically shows the helical trace 43 generated by the rotation of radical cam actuator 33 between the thermal points A and B. The helix trace 43 is illustrative of the sector intercept principle of the invention which is equally applicable to one or more helix traces, such as trace 43, that can be generated by one or more radial cams, such as cams 32 and 33, as desired. Terminal points A and B on helix trace 43 have been selected as the limit points of travel during rotation and translation of the radial cam 33. These limit points A and B correspond respectively to points A and $B_1$, or $B_2$, on each of several possible geometric traces, $A-B_1$ and $A-B_2$, that may be generated during the travel of the remote moving object being controlled by the switch control system 10 of the invention.

Referring now to FIGURES 2 and 3, as radial cam actuator 33 reaches the limit point B on the helix trace 43, the remote moving object simultaneously reaches the limit point $B_1$, $B_2$, or a similar limit point. If design parameters require that the remote handling equipment drive means be de-energized or otherwise controlled at limit point $B_1$ or $B_2$, then the radial cam 33 actuates control switch 46 and accomplishes the desired control function. Any intermediate terminal or control point along the length of travel of the remote moving object between limit points A and $B_1$, $B_2$ and the like, can be accomplished with the same high degree of accuracy by positioning a suitable control switch in the switch control system 10 at the desired intercept point on the particular helical trace which corresponds to a similar point on the remote moving object trace.

FIGURE 3 shows the actuation of a control switch, such as electrical switch 46, by the impingement of a radial cam actuator, such as cam 33, at a desired sector intercept point on the helical trace 43. Control switch 46 has a roller 49 carried by a follower arm 50 which depresses when cam surface 51 of the radial cam 33 impinges upon the roller and actuates the switch. Thus the desired control function over the remote handling equipment drive means is accurately accomplished.

One modification of the switch control system 10 of the invention as previously described is partially shown by FIGURE 4 where tandem radial cam actuators 55 and 56 are adjustably secured on or near end 57 of the lead screw 58 by respective set screws 59 and 60. Cam 55 generates helical trace 63, and cam 56 generates helical trace 64 when both cams are rotated by the lead screw 58 that is simultaneously rotated by a remote handling equipment drive means, not shown. Control switches 66 and 67 are suitably positioned to accurately intercept each of the respective helical traces 63 and 64 at desired terminal or control points. The control switches 66 and 67 are positioned relative to the mounting wall of the switch control system so that as cam 55 develops the helical trace 63 it will by-pass control switch 67 and impinge upon control switch 66. If required, a main means, such as shim plate 69, can be inserted between the control switch 66 and the mounting or side wall 70 to position the switch in the desired trace intercept location.

It is considered to be within the inventive concept of the present invention to suitably position one or more control switches along the axial length of a particular helical trace to accomplish one or more desired control functions over the remote drive means or other operational processes related to the remote object, such as a blower means, fluid baths, and the like. In operation, the radial cams 55 and 56 shown by FIGURE 4 actuate the respective switches 66 and 67 which accomplish the desired control of the remote drive means or other operational processes in a manner similar to that previously described.

FIGURES 5-7 show another form of the switch control system of the present invention. The principle of operation is similar to the switch control system shown by FIGURE 1. A hollow cylindrical member 75 is supported by suitable end plates 77 and 78 concentrically about a multiple spline shaft 80 that is rotated simultaneously by a remote handling equipment drive means, not shown, in a manner similar to that previously described. The internal diameter of the cylindrical member 75 has at least one helical thread 82 which has a thread length that is equal to or substantially equal to the total length of travel of a remote moving object, not shown, which is simultaneously driven by the drive means when the spline shaft 80 is rotated.

A plurality of similar apertures, such as aperture 84 more clearly shown by FIGURE 7, are equally spaced along the heical thread 82 and extend radially through the wall of the cylindrical member 75. If desired, scale indicia, not shown, may be positioned on the external surface of the cylindrical member 75 parallel with the trace of the helical thread 82 defined by the spaced apertures. It is contemplated that such indicia would correlate the lineal travel of the remote object to the thread length for ease in locating control switches, such as electrical control switches 87, 88, and 89, along the helical thread 82. The electrical control switches 87, 88, and 89, or other suitable control means as previously described, can be secured to the external wall of the cylindrical member 75 by snap connectors, screws, and the like.

Each control switch, such as switch 89 more clearly shown by FIGURE 7, has a switch actuator 90 that is adapted to extend radially inwardly through a selected aperture 84 in the helical thread 82. The actuator 90 protrudes inwardly a prescribed distance at a selected intercept point along the helical thread 82 where a desired control function is to be accomplished by actuation of the particular control switch. An actuating member 94 as shown by FIGURES 5 and 6, slidably engages the spline shaft 80 and is rotated thereby. A radially extending follower arm 95 terminates in a suitable roller member 96 more clearly shown by FIGURE 7, which engages the helical thread 82.

Operatively, as the actuating member 94 is rotated, the follower arm 95 rolls along the helical thread 82 and causes axial translation of the actuating member 94 along the spline shaft 80. The roller 96, for example, engages and depresses the switch actuator 90 of control switch 89 at the predetermined intercept point to accomplish the desired control function over the remote drive means, not shown, or other operational processes related to the remote object as previously described. It is contemplated that one or more actuating members, such as member 94, can be positioned on the spline shaft 80 to follow one or more helical paths or threads, such as thread 82.

As will be evidenced from the foregoing description, certain aspects of the invention are not limited to the particular details of construction illustrated, and it is contemplated that additional modifications other than those described will occur to those skilled in the art. It is, therefore, intended that the appended claims shall cover such modifications and other applications that do not depart from the true spirit and scope of the invention.

Having described the invention, what is claimed is:
1. A limit switch comprising:
 (a) a support housing,
 (b) at least one spline shaft rotatably supported by said housing and simultaneously rotated by the drive means,
 (c) at least one screw means rotated by said shaft,
 (d) at least one stationary means engaging said screw means for translation of said rotating screw means,
 (e) at least one adjustable cam means rotated and translated by said screw means and generating a helical trace,
 (f) at least one adjustable control means positioned to intercept said helical trace and thereby said cam means at a predetermined sector on said trace.
2. The limit switch of claim 1 in which said control means controls the drive means.
3. A limit switch for the selective regulation of a drive means comprising:
 (a) a support housing,
 (b) a spline shaft rotatably supported by said housing about a shaft axis of rotation and simultaneously rotated by the drive means about said axis,
(c) a lead screw positioned on said shaft and rotated thereby,
(d) a stationary nut supported by said housing threadably engaging said rotating lead screw for axial translation of said screw generally parallel to said axis of rotation,
(e) at least one adjustable cam means rotated and translated by said screw and generating a helical trace,
(f) at least one adjustable control means supported by said housing and positioned to intercept said helical trace and thereby said cam means at a predetermined intercept point on said trace so that actuation of said control means by said cam means controls the drive means.

4. A limit switch for the selective regulation of a drive means comprising:
(a) a support housing,
(b) a spline shaft rotatably supported by said housing about a shaft axis of rotation,
(c) gear means secured to one end of said spline shaft,
(d) power transmission means connecting said gear means to the drive means for rotating said shaft about said axis,
(e) a lead screw having a bore configuration adapted to slidably engage said spline shaft,
(f) a stationary nut supported by said housing threadably engaging said rotating lead screw for axial translation of said screw in a direction generally parallel to said axis of rotation,
(g) at least a first and a second adjustable cam means rotated and translated by said screw and respectively generating first and second helical traces, and
(h) respective ones of at least a first and a second adjustable switch control means supported by said housing and positioned to intercept associated ones of said first and second helical traces and thereby associated ones of said first and second cam means at a predetermined intercept point on each of said traces.

5. The limit switch of claim 4 in which said control means controls the drive means.

6. The limit switch of claim 4 in which said first and second cam means are juxtaposed on said lead screw.

References Cited by the Examiner
UNITED STATES PATENTS

| | | | |
|---|---|---|---|
| 537,856 | 4/95 | Roberts | 200—47 |
| 808,273 | 12/05 | Darlington | 200—47 |
| 1,608,610 | 11/26 | Myer | 200—47 |
| 2,068,632 | 1/37 | Stites | 200—158 |
| 2,844,656 | 7/58 | Lohs | 200—158 |
| 2,944,244 | 7/60 | Prince | 200—158 |
| 3,056,874 | 10/62 | Glough | 200—158 |

BERNARD A. GILHEANY, *Primary Examiner.*